US012583461B2

(12) United States Patent
Herman

(10) Patent No.: US 12,583,461 B2
(45) Date of Patent: Mar. 24, 2026

(54) SYSTEMS AND METHODS FOR DETECTING DRIVER BEHAVIOR

(71) Applicant: Ford Global Technologies, LLC, Dearborn, MI (US)

(72) Inventor: David Michael Herman, West Bloomfield, MI (US)

( * ) Notice: Subject to any disclaimer, the term of this patent is extended or adjusted under 35 U.S.C. 154(b) by 171 days.

(21) Appl. No.: 18/469,037

(22) Filed: Sep. 18, 2023

(65) Prior Publication Data

US 2025/0091588 A1 Mar. 20, 2025

(51) Int. Cl.
*B60W 40/09* (2012.01)
*B60W 10/30* (2006.01)

(52) U.S. Cl.
CPC ............ *B60W 40/09* (2013.01); *B60W 10/30* (2013.01); *B60W 2510/202* (2013.01); *B60W 2540/223* (2020.02); *B60W 2756/10* (2020.02)

(58) Field of Classification Search
CPC ................. B60W 40/09; B60W 10/30; B60W 2510/202; B60W 2540/223; B60W 2756/10
See application file for complete search history.

(56) References Cited

U.S. PATENT DOCUMENTS

| | | | | |
|---|---|---|---|---|
| 10,836,309 | B1* | 11/2020 | Trundle ............... | G08G 1/0116 |
| 2016/0107655 | A1* | 4/2016 | Desnoyer .............. | B60W 30/16 |
| | | | | 701/23 |
| 2017/0137052 | A1* | 5/2017 | Sham ................... | B60K 35/213 |

| | | | | |
|---|---|---|---|---|
| 2018/0197440 | A1* | 7/2018 | Ramachandra ....... | B60W 30/10 |
| 2018/0373244 | A1* | 12/2018 | Augst ................... | B60W 30/10 |
| 2019/0147263 | A1* | 5/2019 | Kuehnle .............. | G07C 5/0866 |
| | | | | 340/439 |
| 2020/0216079 | A1* | 7/2020 | Mahajan ........... | B60W 60/0051 |
| 2020/0238952 | A1 | 7/2020 | Lindsay et al. | |
| 2020/0239007 | A1* | 7/2020 | Sobhany .............. | G05D 1/0061 |
| 2021/0061355 | A1* | 3/2021 | Okayama ............. | B62D 15/025 |

(Continued)

FOREIGN PATENT DOCUMENTS

JP 2023079904 A 6/2023

OTHER PUBLICATIONS

Ronghua Chen et al., Driver Verification Based on Handgrip Recognition on Steering Wheel, IEEE, Oct. 2011, pp. 1645-1651.

(Continued)

*Primary Examiner* — Sze-Hon Kong

(74) *Attorney, Agent, or Firm* — Frank Lollo; Eversheds Sutherland (US) LLP

(57) ABSTRACT

A vehicle including a steering wheel, a first detection unit, a second detection unit and a processor is disclosed. The first detection unit may be configured to detect a first parameter associated with the steering wheel, and the second detection unit may be configured to capture an input associated with a vehicle occupant. The processor may be configured to obtain the input and the first parameter, and estimate a second parameter associated with a vehicle occupant interaction with the steering wheel based on the input. The processor may be further configured to correlate the first parameter and the second parameter, and determine that a predefined condition may be met based on the correlation. The processor may further transmit a notification responsive to a determination that the predefined condition may be met.

14 Claims, 6 Drawing Sheets

(56)       References Cited

U.S. PATENT DOCUMENTS

| | | | |
|---|---|---|---|
| 2021/0150828 A1 | 5/2021 | Mezaael et al. | |
| 2022/0126863 A1 | 4/2022 | Moustafa et al. | |
| 2022/0203996 A1* | 6/2022 | Katz | B60W 50/14 |
| 2022/0227289 A1* | 7/2022 | Yee | B60Q 1/544 |
| 2022/0266869 A1* | 8/2022 | Ito | B60W 60/005 |
| 2022/0289250 A1* | 9/2022 | Oba | G08G 1/16 |
| 2023/0286550 A1* | 9/2023 | Shahriari | B60W 40/09 |
| 2023/0415810 A1* | 12/2023 | Okazaki | B62D 15/029 |
| 2024/0217579 A1* | 7/2024 | Kirschbaum | B62D 6/10 |
| 2024/0326876 A1* | 10/2024 | Sasayama | G08G 1/16 |
| 2024/0367672 A1* | 11/2024 | Stockinger | G08G 1/0112 |
| 2025/0022292 A1* | 1/2025 | Omi | B60Q 9/00 |

OTHER PUBLICATIONS

M. Shahverdy et al., Driver Behavior Detection Using 1D Convolutional Neural Networks, Electronic Letters, vol. 57, No. 3, Feb. 2021, pp. 118-122.

* cited by examiner

600

602 — Start

604 — Obtain first parameter from a first detection unit and an input from a second detection unit 606 — Estimate a second parameter associated with driver interaction with steering wheel 608 — Correlate the first parameter and the second parameter 610 — Determine that a predefined condition is met 612 — Transmit a notification 614 — Stop

SYSTEMS AND METHODS FOR DETECTING DRIVER BEHAVIOR

FIELD

The present disclosure relates to systems and methods for detecting driver behavior and more particularly to systems and methods for detecting driver steering spoofing based on depth sensing.

BACKGROUND

Many modern vehicles include features that assist drivers in driving their vehicles conveniently. For example, vehicles include features that assist drivers during lane changing, reversing the vehicle, navigating traffic, and/or the like. Modern vehicles also include features to detect driver behavior in the vehicle including driver inattention. Upon detecting that the driver may be inattentive, the vehicle may alert the driver to pay attention. There are instances of drivers spoofing the vehicle feature that detects a driver's behavior in the vehicle. A system is required to detect such instances.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
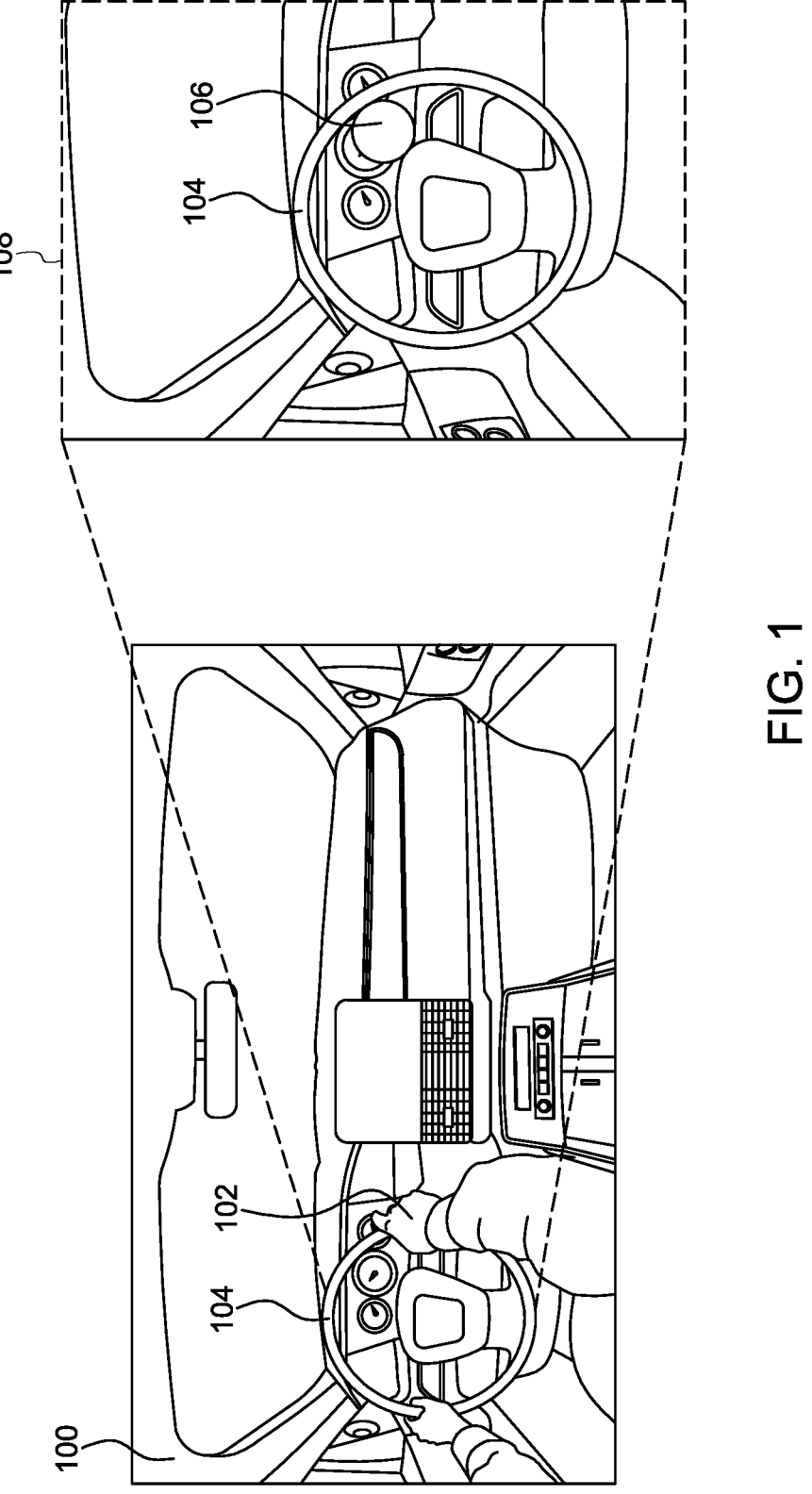
FIG. 1 depicts an example vehicle in which techniques and structures for providing the systems and methods disclosed herein may be implemented.

The present disclosure describes a vehicle configured to detect if a vehicle driver may be spoofing the vehicle or a steering wheel. Specifically, the vehicle may be configured to detect if the driver's hands are actually on the steering wheel or if the driver may be using an external object or a spoofing device to spoof the steering wheel. The vehicle may include a driver spoofing detection system ("system") that may obtain inputs from a first detection unit and a second detection unit of the vehicle, and may determine that the driver may be spoofing the steering wheel based on the obtained inputs. The first detection unit may be, for example, one or more steering wheel sensors, and the second detection unit may be, for example, one or more vehicle interior time-of-flight (TOF) cameras, Radio Detection and Ranging (radar) sensors, Light Detection and Ranging (lidar) sensors, and/or the like. In some aspects, the system may determine that the driver may be spoofing the steering wheel based on the inputs obtained from the first and second detection units when the driver's hands in proximity to the steering wheel may not be visible in the images captured by vehicle's interior cameras, but driver's upper body portion may be visible in the depth images/map obtained from the second detection unit.

In some aspects, to determine a possible driver's spoofing activity, the system may first estimate a position of driver's hands in a vehicle interior portion based on the inputs obtained from the second detection unit. In an exemplary aspect, the system may estimate the position of driver's hands in the vehicle interior portion by generating a digital driver skeletal model based on one or more Artificial Intelligence/Machine Learning based image processing algorithms. Responsive to estimating the position of driver's hands, the system may estimate a probability of driver's hands touching the steering wheel and a steering wheel torque/rotation angle based on the estimated driver's hand position. The system may then correlate the estimated probability/steering wheel torque with the inputs obtained from the first detection unit. The system may determine that the driver may be spoofing the steering wheel based on the correlation. Specifically, the system may determine that the driver's hands may not actually be on the steering wheel based on the correlation. For example, the system may determine that the driver's hands may not be on the steering wheel when a correlation extent between the estimated probability/steering wheel torque and the inputs obtained from the first detection unit may be low (e.g., less than a predefined threshold).

Responsive to determining that the driver may be spoofing the steering wheel, the system may transmit a notification to a vehicle Human-Machine Interface and/or a user device, requesting the driver to hold the steering wheel with the hands and remove the spoofing device/external object.

The present disclosure discloses a vehicle that detects if the driver may be spoofing the steering wheel. The system may request the driver to use the hands for holding the steering wheel when the vehicle detects that the driver may be spoofing. Further, the vehicle uses existing vehicle hardware and components to make the detection, and hence does not require any external hardware components to operate according to the present disclosure.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example vehicle 100 in which techniques and structures for providing the systems and methods disclosed herein may be implemented. The vehicle 100 may take the form of any passenger or commercial vehicle such as, for example, a car, a work vehicle, a crossover vehicle, a truck, a van, a minivan, a taxi, a bus, etc. The vehicle 100 may be a manually driven vehicle, and/or may be configured to operate in a partially autonomous mode, and may include any powertrain such as, for example, a gasoline engine, one or more electrically-actuated motor(s), a hybrid system, etc. A vehicle occupant/user 102 (or a driver 102) may be driving the vehicle 100. In an exemplary aspect, the driver 102 may be driving the vehicle 100 by using and maneuvering a vehicle steering wheel 104 (or steering wheel 104).

In some aspects, the vehicle 100 may include one or more steering wheel sensors (shown as first detection unit 242 in FIG. 2) that may be configured to detect driver hands' touch or interaction with the steering wheel 104. For example, the steering wheel sensors may include capacitive touch sensors and/or steering wheel rotation or torque sensors that may be configured to detect driver hands' touch with the steering wheel 104 (e.g., using capacitive sensing) and steering wheel rotation angle/torque (e.g., using rotation or torque sensors) when the driver 102 rotates the steering wheel 104.

The steering wheel sensors may be configured to continuously (or at a predefined frequency) detect driver hands' interaction, e.g., touch or movement, associated with the steering wheel 104 when the vehicle 100 may be in motion. The vehicle 100 may be configured to output a notification on a vehicle Human-Machine Interface (HMI)/infotainment system (shown as infotainment system 240 in FIG. 2) and/or a user device (shown as user device 204 in FIG. 2) requesting the driver 102 to hold the steering wheel 104 with the hands, when the steering wheel sensors detect that the driver's hands may not be touching the steering wheel 104 and the vehicle 100 may be in motion. Responsive to hearing/viewing the notification, the driver 102 may hold the steering wheel 104 with the hands.

There may be instances where the driver 102 may spoof the vehicle 100 or the steering wheel sensors when the vehicle 100 may be in motion, such that the steering wheel sensors may detect that the driver's hands are on the steering wheel 104; however, in reality, the driver's hands may not be on the steering wheel 104. For example, the driver 102 may place an object 106 (e.g., a ball, etc.) on the steering wheel 104 (as shown in view 108) so that the steering wheel sensors may "detect" that the driver's hands are on the steering wheel 104; however, in reality, the object 106 may be on the steering wheel 104. In this case, the driver hands may be engaged in some other activity (e.g., operating a user device, or the hands may be just resting on driver's lap). In some aspects, the driver 102 may also attach third-party electromechanical, electromagnetic or digital spoofing devices that may spoof the steering wheel sensors into detecting that the driver's hands may be on the steering wheel 104.

To detect such instances of driver spoofing the vehicle 100 or the steering wheel 104, the vehicle 100 may include a driver spoofing detection system (shown as driver spoofing detection system 214 in FIG. 2) that may detect when the driver 102 may be attempting to spoof the vehicle 100. In some aspects, the driver spoofing detection system ("system") may be configured to obtain inputs from one or more vehicle interior depth sensing sensors (shown as second detection unit 244 in FIG. 2), and determine whether the driver 102 may be spoofing the vehicle 100 based on the obtained inputs. The depth sensing sensors may include one or more vehicle interior cameras including, but not limited to, a time-of-flight (TOF) camera, gesture-controlled TOF camera, and/or the like. The depth sensing sensors may further include a Radio Detection and Ranging (radar) sensor, a Light Detection and Ranging (lidar) sensor, and/or the like. In some aspects, according to the present disclosure, the depth sensing sensors may not require the steering wheel 104 and/or the driver's hand to be in the field of view (FOV) of the sensors. Stated another way, the system may determine whether the driver 102 may be spoofing the vehicle 100 based on the inputs obtained from the depth sensing sensors, even when the steering wheel 102 and/or the driver's hands are not in the sensors' FOV.

In some aspects, the system may be an Artificial Intelligence (AI)/Machine Learning (ML) based system that may be configured to estimate driver's hand position in the vehicle 100 (specifically in a vehicle interior portion) based on the inputs obtained from the depth sensing sensors (which may not include view of the steering wheel 104 and/or the driver's hands, as described above). Responsive to estimating the driver's hand position in the vehicle interior portion, the system may estimate a probability of driver's hands touching the steering wheel 104 and a steering wheel rotation angle or torque when the driver 102 moves the hands while touching the steering wheel 104, based on the estimated driver's hand position. If the driver 102 may have adjusted the position of the steering wheel 104, the system may determine steering wheel's adjusted position by obtaining inputs from vehicle's control unit (shown as VCU 212 in FIG. 2) and/or by correlating driver's hand predicted position and inputs obtained from one or more steering wheel sensors.

In some aspects, in addition to or alternative to estimating the probability as described above, the system may use Bayesian or non-Bayesian approaches (as part of AI/ML) to determine a "confidence value" or "confidence level" of detection of driver's hands touching the steering wheel 104 which may be used for thresholding (e.g., only confidence levels above a predefined threshold may be considered for further action). The system may also use end-to-end neural network to determine the confidence level.

The system may correlate or compare the estimated probability and steering wheel torque with "actual" data/information associated with capacitive sensing and steering wheel rotation angle/torque obtained from the steering wheel sensors. The system may use other sensors as well for correlation, and the examples described here should not be construed as limiting. The system may determine that the driver 102 may be spoofing the vehicle 100 when the estimated probability and steering wheel torque do not correlate with the actual data/information. Stated another way, the system may determine that the driver 102 may be spoofing the vehicle 100 when a correlation extent value between the estimated probability/steering wheel torque and the actual data/information may be less than a predefined threshold. In some aspects, the predefined threshold may be tuned or adjusted based on one or more parameters including, but not limited to, vehicle's mode of operation, known noise factors (e.g., TOF camera may detect multi-path interference or low signal to noise due to sun glare), and/or the like. Responsive to such determination, the system may output a notification to the vehicle HMI and/or the user device requesting the driver 102 to hold the steering wheel 104 with the hands (and remove the spoofing device/object 106).

In some aspects, the system may estimate driver's hand position in the vehicle interior portion by generating a digital driver skeletal model (shown as digital driver skeletal model 306 in FIG. 3) based on the inputs obtained from the depth sensing sensors. In some aspects, the system may use partial depth view of the driver 102 obtained from the depth sensing sensors (with views that may be occluded or out of sensors' FOV) to generate an in-view driver's skeletal model. A person ordinarily skilled in the art may appreciate that the confidence level of the positions of different skeletal model's components may depend on the extent of occlusion and FOV of the depth sensing sensors. Responsive to generating the driver skeletal model, the system may determine distance between driver's hands in the driver skeletal model and a position of the steering wheel 104 in the vehicle interior portion. The system may determine that the driver hands may be touching the steering wheel 104 when the determined distance may be less than a predefined distance threshold, and may not be touching the steering wheel 104 when the determined distance may be greater than the predefined distance threshold.

Further details of the system are described below in conjunction with FIG. 2.

The vehicle 100, the driver 102 and the driver spoofing detection system implement and/or perform operations, as described here in the present disclosure, in accordance with the owner manual and safety guidelines. In addition, any action taken by the driver 102 should comply with all the rules specific to the location and operation of the vehicle 100 (e.g., Federal, state, country, city, etc.). The notifications, as provided by the vehicle 100 or the driver spoofing detection system, should be treated as suggestions and only followed according to any rules specific to the location and operation of the vehicle 100.

Figure 2:
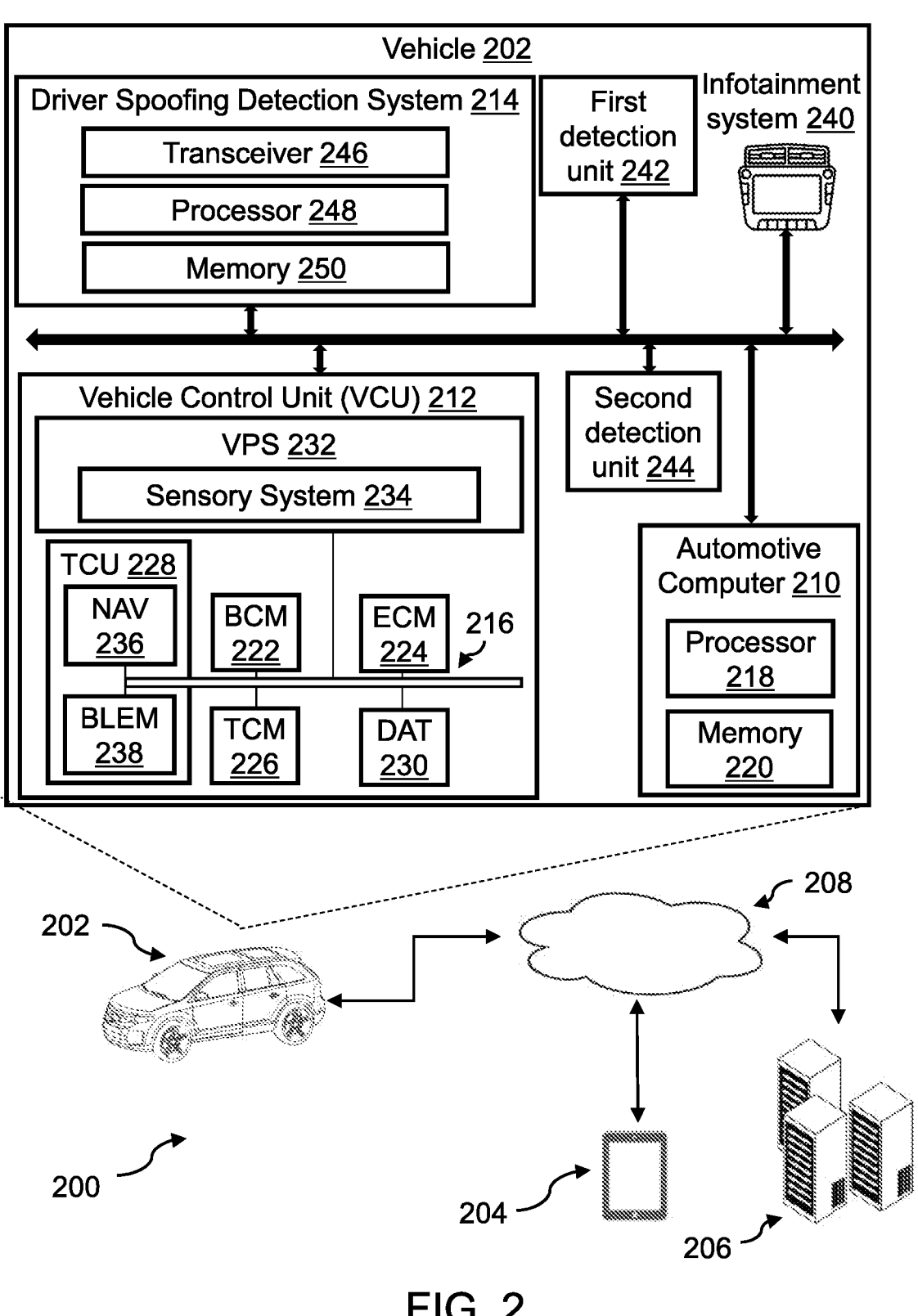
FIG. 2 depicts a block diagram of an example driver behavior detection system in accordance with the present disclosure.

FIG. 2 depicts a block diagram of an example driver behavior detection system 200 in accordance with the present disclosure. While describing FIG. 2, references will be made to FIGS. 3-5.

The system 200 may include a vehicle 202, a user device 204, and one or more servers 206 communicatively coupled with each other via one or more networks 208. The vehicle 202 may be same as the vehicle 100 described above in conjunction with FIG. 1. The user device 204 may be associated with the driver 102, and may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may store instructions associated with one or more AI/ML based algorithms that may enable the vehicle 202 to perform driver behavior detection, as described in detail later below. The server(s) 206 may transmit the instructions associated with the AI/ML based algorithms to the vehicle 202 at a predefined frequency or when the vehicle 202 requests the instructions, via the network(s) 208.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a driver spoofing detection system 214 (or system 214). The VCU 212 may include a plurality of Electronic Control Units (ECUs) 216 disposed in communication with the automotive computer 210.

The user device 204 may connect with the automotive computer 210 and/or the system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the system 214 may be installed in a vehicle engine compartment (or elsewhere in the vehicle 202), in accordance with the disclosure. Further, the automotive computer 210 may operate as a functional part of the system 214. The automotive computer 210 may be or include an electronic vehicle controller, having one or more processor(s) 218 and a memory 220. Moreover, the system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage medium or memory storing a driver spoofing detection program code. The memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 may include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging ("lidar") sensor, door sensors, proximity sensors, temperature sensors, wheel sensors, ambient weather sensors, vehicle interior and exterior cameras, steering wheel sensors, inertial measurement unit (IMU), etc.

In some aspects, the VCU 212 may control vehicle operational aspects and implement one or more instruction sets received from the user device 204, from one or more instruction sets stored in the memory 220, including instructions operational as part of the system 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from the automotive computer 210, the system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that may include, for example, active parking assistance, vehicle backup assistance, and adaptive cruise control, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or output or display notifications (including visual and/or audible alert notifications), navigation maps, etc. on the touchscreen interface portion.

The vehicle 202 may further include a first detection unit 242 and a second detection unit 244. The first detection unit 242 may include a steering wheel touch sensor (e.g., a capacitive touch sensor) and/or a steering wheel torque or rotation angle sensor. The first detection unit 242 may be configured to detect a first parameter associated with the steering wheel 104. In an exemplary aspect, the first parameter may be associated with capacitive sensing of the steering wheel touch sensor and/or a steering wheel torque or steering wheel rotation angle. In some aspects, the first detection unit 242 may be part of the vehicle sensory system 234. In other aspects, the first detection unit 242 may be separate from the vehicle sensory system 234.

The second detection unit 244 may be configured to capture one or more inputs associated with the driver 102 when the driver 102 may be located in the vehicle interior portion. The second detection unit 244 may include, but is not limited to, one or more depth sensors, radar sensors, lidar sensors, TOF cameras, and/or the like. The inputs captured by the second detection unit 244 may include, but are not limited to, a depth image, a plurality of voxels, a point cloud, and/or the like, associated with the driver 102 when the driver 102 may be located in the vehicle interior portion. In some aspects, the inputs may include depth data/information as a depth map/image, point cloud, or occupancy voxel directly or after processing. Further, the inputs may include information on reflectivity of object (e.g. return signal intensity). In some aspects, the depth information may be determined by direct or indirect time of flight principles. Depending on the capabilities of the sensors included in the second detection unit 244, an estimate of velocity may be generated which may be compared with inputs obtained from one or more vehicle sensors. For example, a radar may estimate depth and relative radial velocity which may be used to estimate velocity vector of a driver's hands/arms, which may be compared with the turning rate of the steering wheel 104 (as an example).

In some aspects, the second detection unit 244 may be part of the vehicle sensory system 234. In other aspects, the second detection unit 244 may be separate from the vehicle sensory system 234.

The computing system architecture of the automotive computer 210, the VCU 212, and/or the system 214 may omit certain computing modules. It should be readily understood that the computing environment depicted in FIG. 2 is an example of a possible implementation according to the present disclosure, and thus, it should not be considered as limiting or exclusive.

In accordance with some aspects, the system 214 may be integrated with and/or executed as part of the ECUs 216. The system 214, regardless of whether it is integrated with the automotive computer 210 or the ECUs 216, or whether it operates as an independent computing system in the vehicle 202, may include a transceiver 246, a processor 248, and a computer-readable memory 250.

The transceiver 246 may be configured to receive information/inputs from one or more external devices or systems, e.g., the user device 204, the server(s) 206, and/or the like via the network 208. For example, the transceiver 246 may be configured to receive instructions associated with one or more AI/ML based algorithms from the server(s) 206, as described above. Further, the transceiver 246 may transmit notifications or signals to the external devices or systems. In addition, the transceiver 246 may be configured to receive information/inputs from vehicle components such as the infotainment system 240, the first detection unit 242, the second detection unit 244, and/or the like. Further, the transceiver 246 may transmit signals (e.g., command signals) or notifications to the vehicle components such as the infotainment system 240.

The processor 248 and the memory 250 may be same as or similar to the processor 218 and the memory 220, respectively. In some aspects, the processor 248 may utilize the memory 250 to store programs in code and/or to store data for performing aspects in accordance with the disclosure. The memory 250 may be a non-transitory computer-readable storage medium or memory storing the driver spoofing detection program code. In some aspects, the memory 250 may additionally store instructions/information/data obtained from the server(s) 206, the user device 204, and the first and second detection units 242 and 244.

Figure 3:
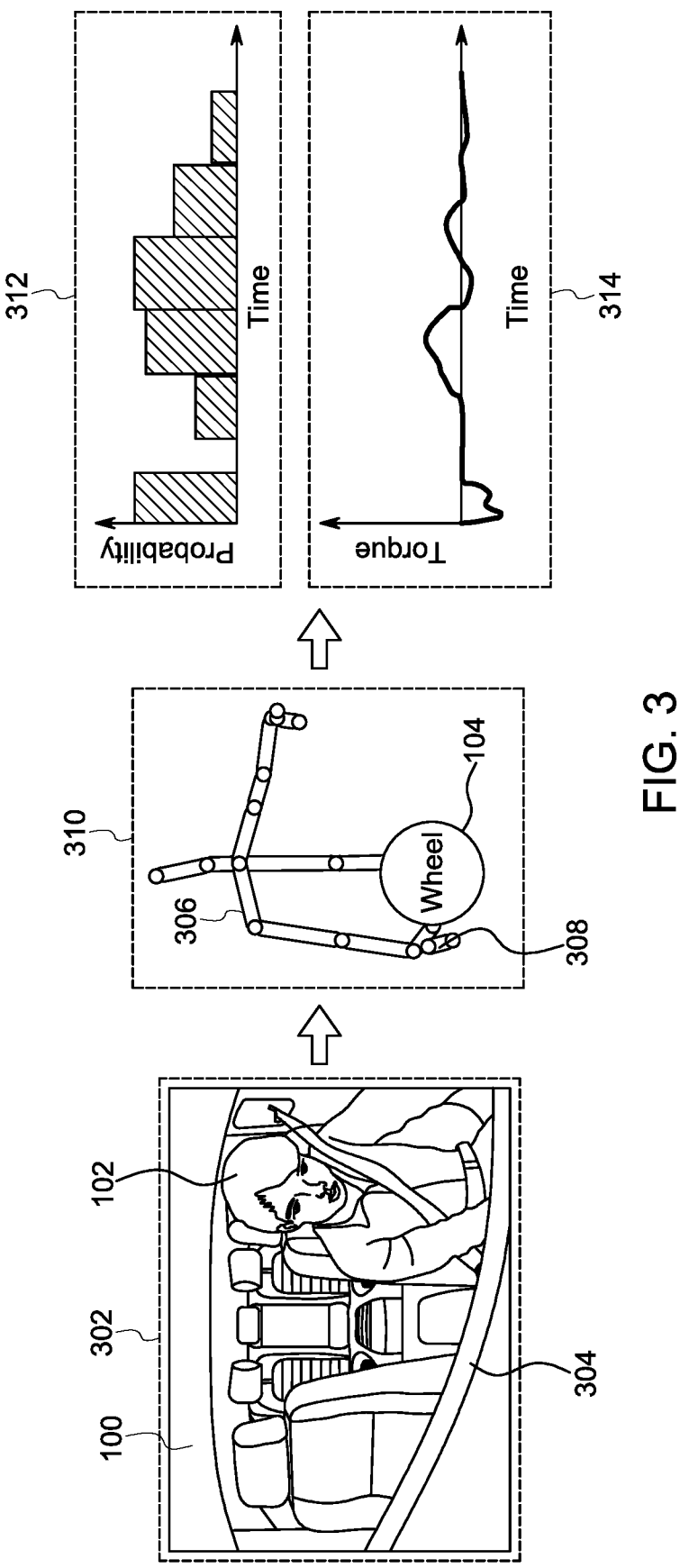
FIG. 3 depicts an example driver image, a driver skeletal model and example steering wheel touch probability and steering wheel torque, in accordance with the present disclosure.

In some aspects, the processor 248 may be an AI/ML based processor that may be configured to execute the instructions associated with the AI/ML based algorithms stored in the memory 250 (as obtained from the server(s) 206) to determine location/position of driver's hands in the vehicle interior portion, generate a digital driver skeletal model 306 (as shown in FIG. 3) and/or estimate a probability of driver's hands touching the steering wheel 104 and expected steering wheel rotation angle/torque based on the inputs obtained from the second detection unit 244. In some aspects, the processor 248 may perform the functions/ actions described here by using supervised or reinforcement machine learning and generating a "trained" machine learning module. Responsive to generating the trained machine learning module, the processor 248 may store the module in the memory 250 and use the instructions stored in the module to detect possible driver steering wheel spoofing activity, when the driver 102 drives the vehicle 100.

A person ordinarily skilled in the art may appreciate that machine learning is an application of Artificial Intelligence (AI) using which systems or processors (e.g., the processor 248) may have the ability to automatically learn and enhance from experience without being explicitly programmed. Machine learning focuses on use of data and algorithms to imitate the way humans learn. In some aspects, the machine learning algorithms may be created to make classifications and/or predictions. Machine learning based systems may be used for a variety of applications including, but not limited to, speech recognition, image or video processing and statistical analysis, probability determination, and/or the like.

Machine learning may be of various types based on data or signals available to the learning system. For example, the machine learning approach may include supervised learning, unsupervised learning, semi-supervised learning, or reinforcement learning. The supervised learning is an approach that may be supervised by a human. In this approach, the machine learning algorithm may use labeled training data and defined variables. In the case of supervised learning, both the input and the output of the algorithm may be specified/defined, and the algorithms may be trained to classify data and/or predict outcomes accurately. In the present disclosure, since the processor 248 (or the "AI/ML" based processor) performs functions or makes predictions/ estimation based on inputs obtained from the depth sensing sensors (where the inputs may include noise), in some aspects, the system 214 may further include filters such Kalman filter, particle filter, etc., and the processor 248 may obtain "filtered" inputs via the filters to perform the functions or make the predictions/estimation.

Broadly, the supervised learning may be of two types, "regression" and "classification". In classification learning, the learning algorithm may help in dividing the dataset into classes based on different parameters. In this case, a computer program may be trained on the training dataset and based on the training, the computer program may categorize input data into different classes. Some known methods used in classification learning include Logistic Regression, K-Nearest Neighbors, Support Vector Machines (SVM), Kernel SVM, Naïve Bayes, Decision Tree Classification, and Random Forest Classification.

In regression learning, the learning algorithm may predict output value that may be of continuous nature or real value. Some known methods used in regression learning include Simple Linear Regression, Multiple Linear Regression, Polynomial Regression, Support Vector Regression, Decision Tree Regression, and Random Forest Regression.

The unsupervised learning is an approach that involves algorithms that may be trained on unlabeled data. An unsupervised learning algorithm may analyze the data by its own and find patterns in input data. Further, semi-supervised learning is a combination of supervised learning and unsupervised learning. A semi-supervised learning algorithm involves labeled training data; however, the semi-supervised learning algorithm may still find patterns in the input data. Reinforcement learning is a multi-step or dynamic process. This model is similar to supervised learning, but may not be trained using sample data. This model may learn "as it goes" by using trial and error. A sequence of successful outcomes may be reinforced to develop the best recommendation or policy for a given situation in reinforcement learning. As described above, in some aspects, the processor 248 may perform the functions/actions described in the present disclosure by using reinforcement machine learning.

In some aspects, to generate the trained machine learning module, the processor 248 may first "monitor" driver's movement (e.g., hand movement, upper body movement, eye gaze movement) in the vehicle 100 when the probability of spoofing may be low (e.g., when the driver 102 enters the vehicle 100 or switches ON the ignition or operates the infotainment system 240). During this time duration, the processor 248 may estimate location/position of driver's hands, generate the digital driver skeletal model, estimate the probability of driver's hands touching respective vehicle components (e.g., the infotainment system 240 or a vehicle ignition actuator), and/or the like, based on the inputs obtained from the second detection unit 244 and the instructions associated with the AI/ML based algorithms stored in the memory 250. The processor 248 may then compare "actual" data (e.g., when the driver 102 uses the infotainment system 240, the infotainment system 240 may send a driver interaction confirmation signal to the processor 248) with the estimated data described above, to calibrate the machine learning module.

The processor 248 may also transmit a request (e.g., via the infotainment system 240 or the user device 204) to the driver 102 to perform a predefined action, e.g., turn the steering wheel 104 left or right at a requested angle. When the driver 102 turns the steering wheel 104 responsive to receiving the request, the processor 248 may estimate the steering wheel rotation angle/torque based on the inputs obtained from the second detection unit 244 and compare it with the rotation angle requested by the processor 248 or determined using inputs obtained from the first detection unit 242. Based on the comparison, the processor 248 may calibrate the machine learning module till the error in detection may be less than a predefined threshold. In this manner, the processor 248 may "train" the machine learning module. Once the error in the detection may be less than the predefined threshold, or when the processor 248 may have "confidence" (e.g., confidence level above a predefined confidence threshold) that the detection/estimation of driver hand position, probability, etc. described above may be high, the processor 248 may treat the calibrated machine learning module as "trained" machine learning module and may store the trained machine learning module in the memory 250. The processor 248 may keep on updating or enhancing the trained machine learning module based on new data, information and learnings.

In some aspects, while training the machine learning module, the processor 248 may also take into account one or more noise factors that may be present in the inputs obtained from the second detection unit 244 or interference/deviations/inconsistencies in the inputs due to driver's sitting area position, driver's height (e.g., when the second detection unit 244 may only be able to capture driver's head, as opposed to driver's head, shoulders and/or upper arms), varying driving hand positions or driving styles, etc. The processor 248 may also take into account effects of vehicle's rate of change of speed on estimated steering wheel torque while training the machine learning module.

In some aspects, the processor 248 may additionally perform pre-processing to make comparison/correlation (described above) test or work better with, e.g. Pearson correlation coefficient, Spearman's rank correlation coefficient, and/or the like. Experimental data may be used to determine an appropriate threshold for the correlation coefficients described above. Edge cases such driver driving with chin or knees, or a passenger driving the vehicle, etc. may also be factored in the training process.

Once the machine learning module may be trained, the processor 248 may use the module during vehicle operation, as described below.

In operation, the processor 248 may obtain data (or "first parameter") associated with capacitive sensing of the steering wheel touch sensor and/or the steering wheel torque or steering wheel rotation angle from the first detection unit 242, when the driver 102 may be driving the vehicle 202. Example data/output obtained from the steering wheel touch sensor is shown in graphs 402, 502 and 504 in FIGS. 4 and 5 respectively. In each of the graphs 402, 502 and 504, Y-axis depicts output from the steering wheel touch sensor as value of "0" or "1", and X-axis depicts time. An output of "0" from the steering wheel touch sensor indicates that the first detection unit 242 does not detect any touch on the steering wheel 104, and an output of "1" indicates that the first detection unit 242 detects a touch on the steering wheel 104.

Figure 4:
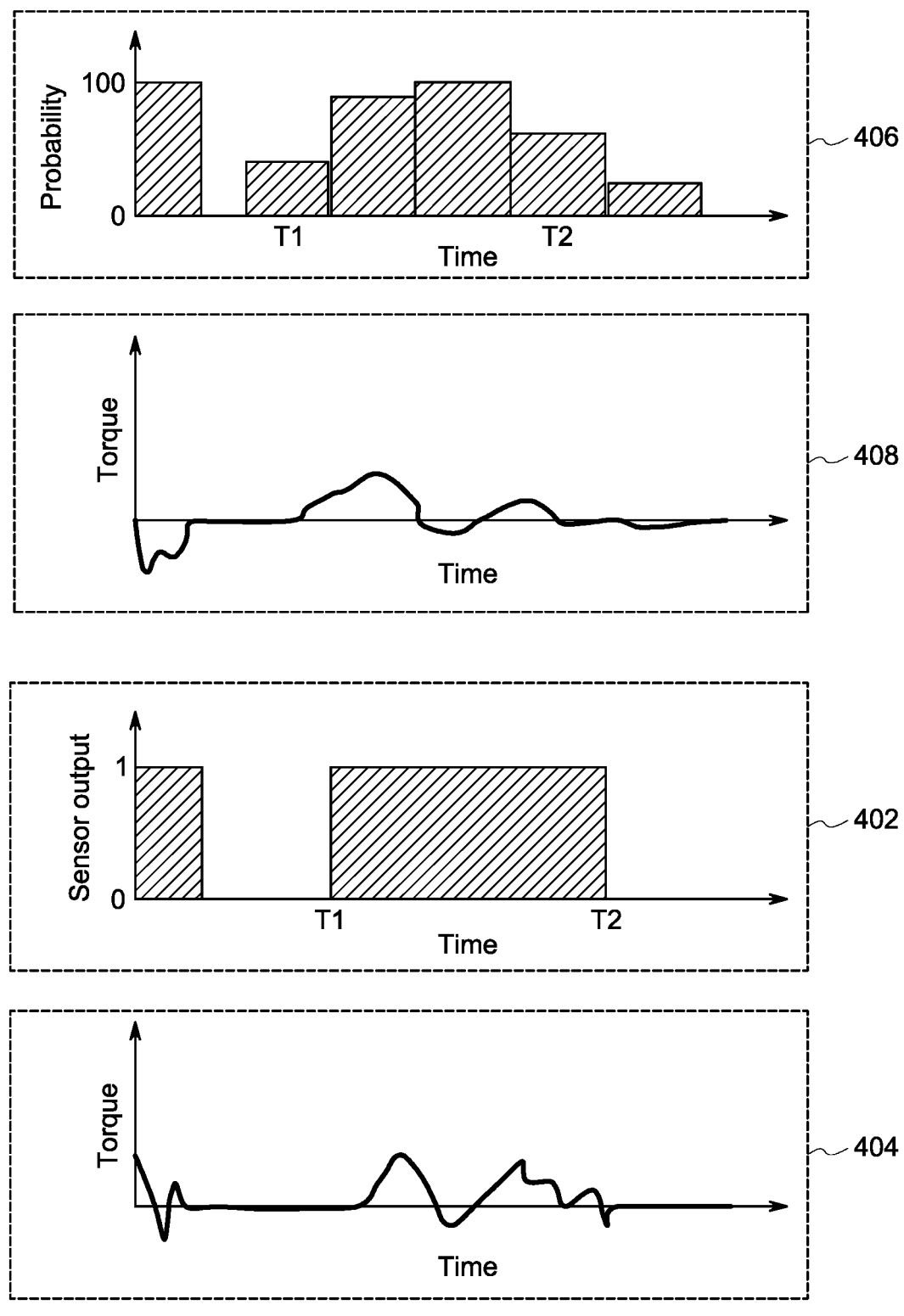
FIG. 4 depicts first example estimated parameters associated with driver interaction with a steering wheel and inputs obtained from one or more vehicle sensors in accordance with the present disclosure.
Figure 5:
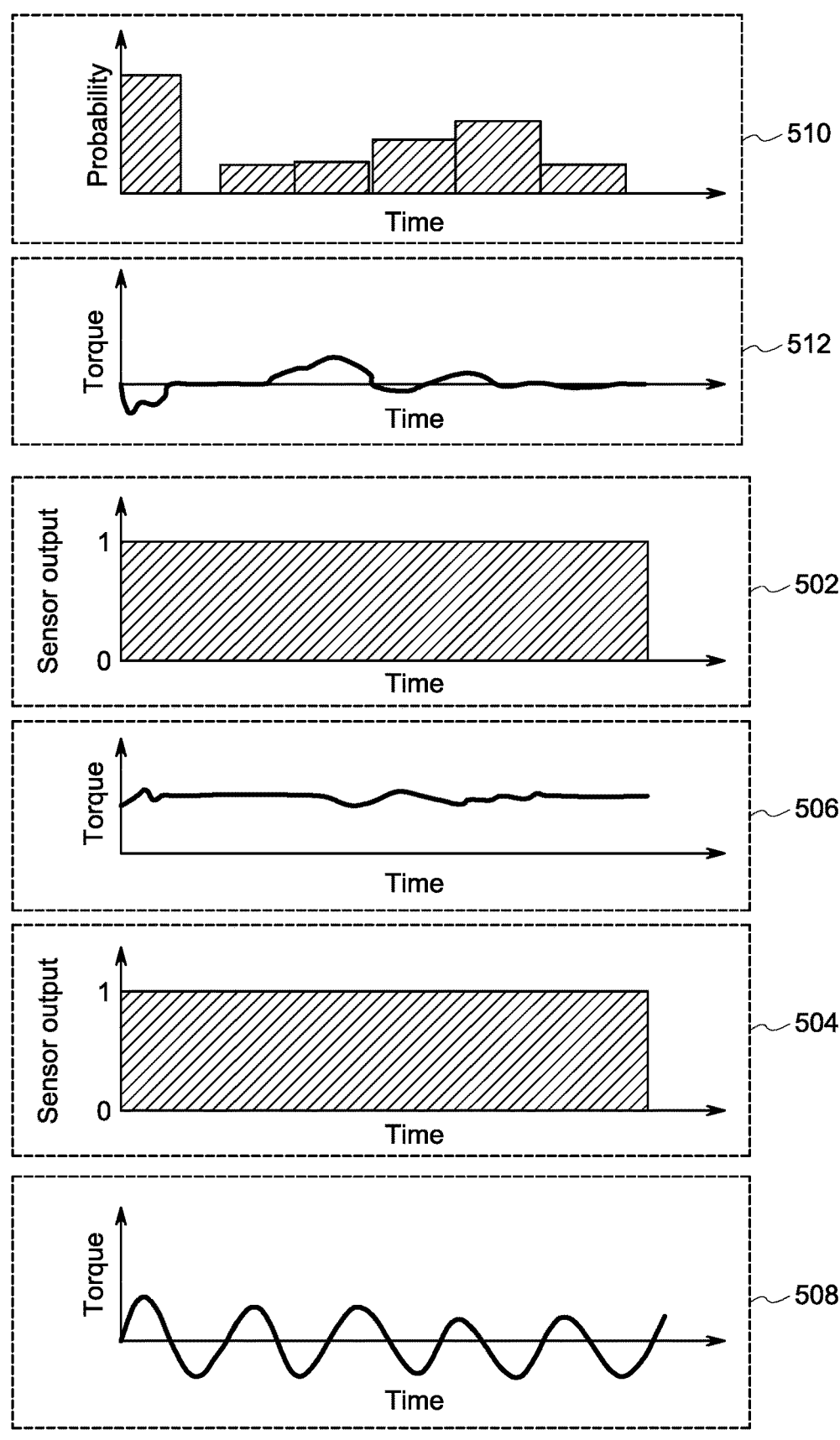
FIG. 5 depicts second example estimated parameters associated with driver interaction with a steering wheel and inputs obtained from one or more vehicle sensors in accordance with the present disclosure.

Further, example steering wheel torque obtained from the first detection unit 242 is shown as graphs 404, 506 and 508 in FIGS. 4 and 5 respectively. In each of the graphs 404, 506 and 508, Y-axis depicts the measured torque, and X-axis depicts time.

In addition to obtaining the data from the first detection unit 242, the processor 248 may obtain the inputs from the second detection unit 244 described above. For example, the processor 248 may obtain depth images of the driver 102 in the vehicle interior portion. The processor 248 may use the obtained data and inputs to detect if the driver 102 may be spoofing the vehicle 202 or the steering wheel 104. In some aspects, the processor 248 may obtain the data and inputs described here to detect possible driver spoofing activity when a field of view (FOV) of vehicle's interior camera may be obstructed and the vehicle's interior camera may not be able to capture images of driver's hands on the steering wheel 104, as shown in view 302 of FIG. 3. As shown in the view 302, the FOV of vehicle's interior camera may be obstructed by a structure/object 304 (that may be part of the vehicle 202 or an external object/structure attached to the vehicle interior portion). In this case, it may not be possible to determine whether the driver's hands are on the steering wheel 104 or not, based on the images obtained from the vehicle's interior camera. In such cases, the processor 248 may use the data and inputs from the first and second detection units 242, 244 to detect if the driver's hands are actually on the steering wheel 104 or the driver 102 may be spoofing the vehicle 202 or the steering wheel 104.

Responsive to obtaining the data and inputs from the first and second detection units 242, 244, the processor 248 may use the trained machine learning module described above (or an end-to-end neural network model) to estimate a location of driver hands in the vehicle interior portion based on the inputs obtained from the second detection unit 244. Stated another way, the processor 248 may use the depth images of the driver 102 in the vehicle interior portion and the trained machine learning module to estimate location of driver hands in the vehicle interior portion.

In some aspects, the processor 248 may additionally or alternatively estimate the location of driver hands in the vehicle interior portion by generating the digital driver skeletal model 306 by using the depth image obtained from the second detection unit 244 and one or more known image processing algorithms/processes for generating 3-Dimensions models based on 2-Dimensional images. Examples of such image processing algorithms/processes include, but are not limited to, "Occlusion-tolerant and personalized 3D human pose estimation in RGB images" by A. Qammaz and A. Argyros (2020 25th International Conference on Pattern Recognition (ICPR), 2021, pp. 6904-6911, doi: 10.1109/ICPR48806.2021.9411956), "A Joint Model for 2D and 3D Pose Estimation from a Single Image" by Simo-Serra, Edgar et al (2013 IEEE Conference on Computer Vision and Pattern Recognition (2013): 3634-3641), and "Neural Body: Implicit Neural Representations with Structured Latent Codes for Novel View Synthesis of Dynamic Humans" by Sida Peng et al (CVPR 2021), which are incorporated here by reference.

Responsive to estimating the location of driver's hands in the vehicle interior portion (by using the trained machine learning module or by generating the digital driver skeletal model 306), the processor 248 may estimate a probability of driver's hands touching the steering wheel 104 and a steering wheel torque/rotation angle (collectively referred to as a "second parameter" associated with the driver's interaction with the steering wheel 104) based on the estimated driver's hand location. In an exemplary aspect, the processor 248 may estimate the probability of driver's hands touching the steering wheel 104 by calculating a distance between the estimated location of driver hands in the vehicle interior portion and position of the steering wheel 104 (that may be pre-stored in the memory 250) in the vehicle interior portion. An example view of driver hands 308 in proximity to the steering wheel 104 is shown as view 310 in FIG. 3. When the calculated distance may be less than a first predefined distance threshold, the processor 248 may estimate that the probability of driver's hands touching the steering wheel 104 may be high. On the other hand, when the calculated distance may be greater than a second predefined distance threshold (which may be same as or different from the first predefined distance threshold), the processor 248 may estimate that the probability of driver's hands touching the steering wheel 104 may be low.

Example estimated probabilities associated with the driver's hands 308 touching the steering wheel 104 are shown as graphs 312, 406 and 510 in FIGS. 3, 4 and 5 respectively. In each of the graphs 312, 406 and 510, Y-axis depicts the estimated probabilities and X-axis depicts time.

In a similar manner, the processor 248 may estimate the steering wheel torque by tracking over a time duration driver's hand movement in the vehicle interior portion, based on the estimated location of driver's hands 308 in the vehicle interior portion. Example estimated steering wheel torques with time are shown as graphs 314, 408 and 512 in FIGS. 3, 4 and 5 respectively. In each of the graphs 314, 408 and 512, Y-axis depicts the estimated steering wheel torque and X-axis depicts time.

Responsive to estimating the second parameter, the processor 248 may correlate the estimated second parameter with the data/first parameter obtained from the first detection unit 242, and determine whether a predefined condition may be met based on the correlation. Responsive to determining that the predefined condition may be met, the processor 248 may determine that the driver 102 may be spoofing the vehicle 100 or the steering wheel 104.

In an exemplary first aspect, the processor 248 may correlate the first and second parameters by comparing the "actual" steering wheel torque as obtained from the first detection unit 242 with the "estimated" steering wheel torque described above, and calculating a difference (e.g., an average difference over a predefined time duration) between the actual and estimated steering wheel torques. When the calculated difference may be greater than a predefined difference threshold, the processor 248 may determine that the predefined condition may be met and the driver 102 may be spoofing the vehicle 100 or the steering wheel 104. For example, as shown in FIG. 5, the pattern of estimated steering wheel torque over time in the graph 512 is substantially different from the pattern of "actual" steering wheel torques over time depicted in the graphs 506 and 508. In this case, the processor 248 may determine that the difference between the estimated and actual steering wheel torques may be greater than the predefined difference threshold, and may hence determine that the driver 102 may be spoofing the vehicle 100/steering wheel 104. In an exemplary aspect, the graph 506 may be associated with an instance when the driver 102 may have placed the object 106 on the steering wheel 104, and the graph 508 may be associated with an instance when the driver 102 may have used an electromechanical or electromagnetic spoofing device.

On the other hand, the pattern of estimated steering wheel torque over time in the graph 408 is similar to the pattern of actual steering wheel torque over time depicted in the graph 404. In this case, the processor 248 may determine that the difference between the estimated and actual steering wheel torques may be less than the predefined difference threshold, and may hence determine that the driver 102 may not be spoofing the vehicle 100/steering wheel 104. Stated another way, in this case, the processor 248 may determine that the driver 102 may be controlling/maneuvering the steering wheel 104 using the hands.

In an exemplary second aspect, the processor 248 may correlate the first and second parameters by identifying similarity or "correlation extent value" between the estimated probability associated with the driver's hands 308 touching the steering wheel 104 and the actual capacitive sensing data obtained from the first detection unit 242. In this case, the processor 248 may compare the estimated probability with the capacitive sensing data, and may identify a difference (e.g., an average difference over a predefined time duration) between the estimated probability and the capacitive sensing data. In an exemplary aspect, an output of "1" (shown in graphs 402, 502 and 504) for capacitive sensing data may be treated, by the processor 248, as 100% actual probability that the driver 102 may be touching the steering wheel 104.

In some aspects, the processor 248 may determine that the correlation extent value between the first and second parameters may be high, when the difference between the estimated and actual probabilities described above may be low. For example, as shown in FIG. 4, between times "T1" and "T2", a difference between estimated probability shown in the graph 406 and the actual probability shown in the graph 402 may be low. Within this time duration, the processor 248 may determine that the correlation extent value between the first and second parameters may be high. Responsive to such determination, the processor 248 may determine that the driver 102 may not be spoofing the vehicle 100/steering wheel 104 and may be using the hands to control the steering wheel 104.

On the other hand, the processor 248 may determine that the correlation extent value between the first and second parameters may be low (e.g., less than a threshold value), when the difference between the estimated and actual probabilities described above may be high. For example, as shown in FIG. 5, the difference between the estimated probability shown in the graph 510 and the actual probabilities shown in the graphs 502 and 504 may be high. Responsive to determining that the difference may be high, the processor 248 may determine that the correlation extent value between the first and second parameters may be low. Responsive to such determination, the processor 248 may determine that the predefined condition may be met and the driver 102 may be spoofing the vehicle 100/steering wheel 104. In an exemplary aspect, the graphs 502 and 504 may be associated with instances where the driver 102 may be using the object 106 or an electromechanical/electromagnetic spoofing device for spoofing.

Responsive to determining that the predefined condition may be met (i.e., the driver 102 may be spoofing), the processor 248 may perform a predefined action. For example, the processor 248 may transmit, via the transceiver 246, a notification to the infotainment system 240 and/or the user device 204, responsive to determining that the predefined condition may be met. The notification may include an audio and/or video notification or request for the driver 102 to control or hold the steering wheel 104 by using the hands and/or to remove the spoofing device/object 106.

Although the description above describes as aspect of detecting if the driver 102 may be spoofing, a person ordinarily skilled in the art may appreciate that the present disclosure may also be applied to other applications, such as determining if the driver 102 may be ready to take over control of the vehicle 202 (e.g., whether the driver 102 has one hand or both hands on the steering wheel 104).

Figure 6:
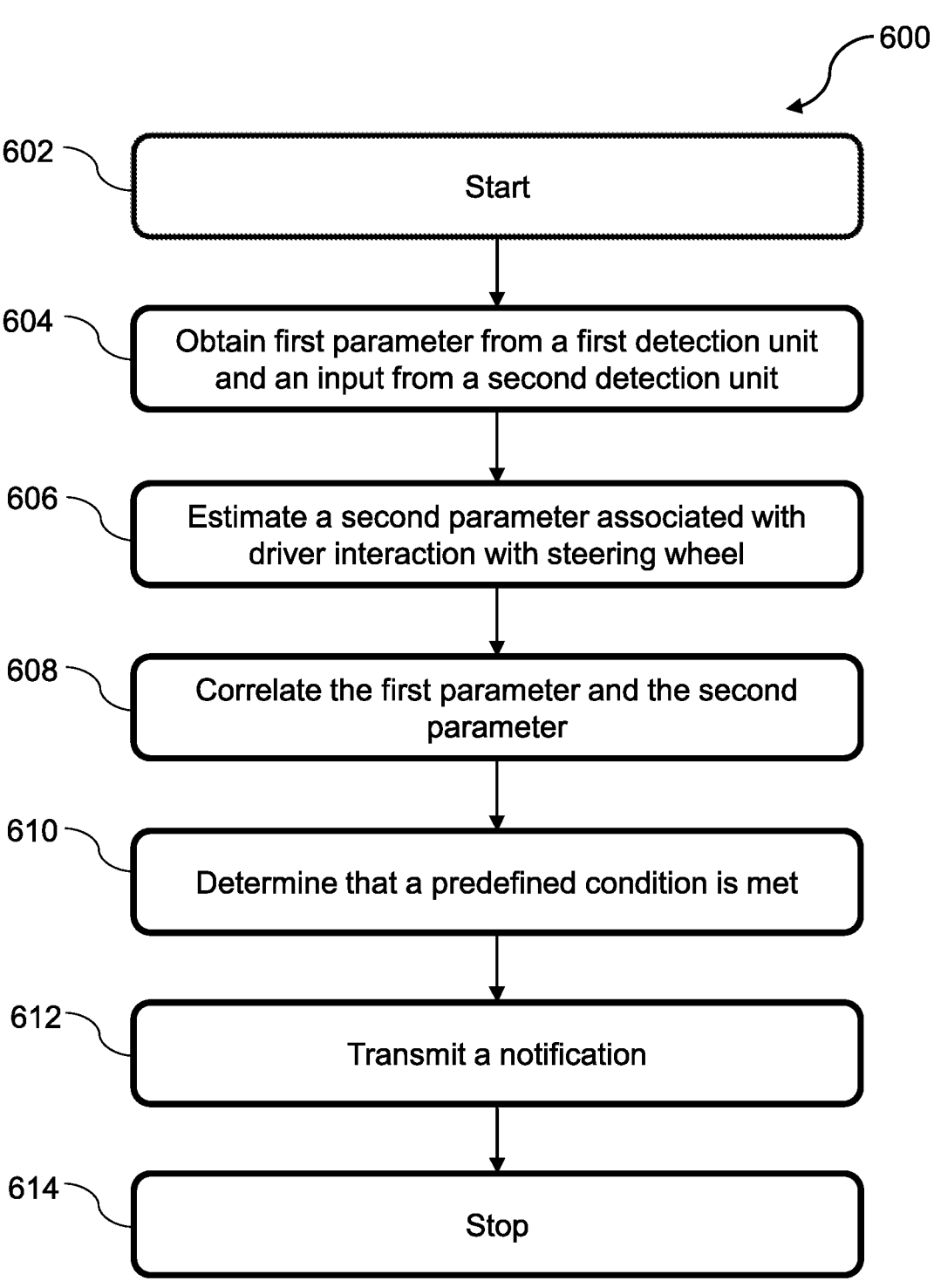
FIG. 6 depicts a flow diagram of an example method for detecting driver behavior in a vehicle in accordance with the present disclosure.

FIG. 6 depicts a flow diagram of an example method 600 for detecting driver behavior in the vehicle 100 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 248, the first parameter from the first detection unit 242 and the input from the second detection unit 244. Examples of the first parameters and the input are described above in conjunction with FIG. 2.

At step 606, the method 600 may include estimating, by the processor 248, the second parameter associated with driver's interaction with the steering wheel 104, based on the input obtained from the second detection unit 244. At step 608, the method 600 may include correlating, by the processor 248, the first parameter and the second parameter. At step 610, the method 600 may include determining, by the processor 248, that the predefined condition may be met based on the correlation. At step 612, the method 600 may include transmitting, by the processor 248, a notification to the infotainment system 240 and/or the user device 204 responsive to determining that the predefined condition may be met.

The method 600 may end at step 614.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a steering wheel;
a first detection unit configured to detect a first parameter associated with the steering wheel, wherein the first parameter is indicative of an interaction with the steering wheel;
a second detection unit configured to capture an input associated with a vehicle occupant;
a processor communicatively coupled with the steering wheel, the first detection unit and the second detection unit, wherein the processor is configured to:
obtain the input and the first parameter;
estimate a first location of vehicle occupant hands in a vehicle interior portion at a first time based on the input;
estimate a probability of vehicle occupant hands touching the steering wheel based on the first location of vehicle occupant hands in the vehicle interior portion at the first time;
estimate a second location of vehicle occupant hands in the vehicle interior portion at a second time; and
estimate a steering wheel torque based on the first time, the second time, the first location of the vehicle occupant hands at the first time, and the second location of the vehicle occupant hands at the second time;
compare the steering wheel torque estimated based on the first time, the second time, the first location of the vehicle occupants hands at the first time, and the second location of the vehicle occupant hands at the second time with the first parameter;
determine that detection of the first parameter was triggered by an action other than a contact of the steering wheel by a hand of the vehicle occupant based on the comparison; and
transmit a notification responsive to a determination that the detection of the first parameter was triggered by an action other than a contact of the steering wheel by a hand of the vehicle occupant.

2. The vehicle of claim 1, wherein the first detection unit is a steering wheel touch sensor, and wherein the first parameter is associated with capacitive sensing of the steering wheel touch sensor.

3. The vehicle of claim 1, wherein the first detection unit is a steering wheel torque sensor, and wherein the first parameter is associated with a steering wheel torque or steering wheel rotation angle.

4. The vehicle of claim 1, wherein the second detection unit is at least one of a depth-sensing sensor, a Radio Detection and Ranging (radar) sensor, a time-of-flight (TOF) camera, and a Light Detection and Ranging (lidar) sensor.

5. The vehicle of claim 1, wherein the input comprising at least one of a depth image, a plurality of voxels, and a point cloud.

6. The vehicle of claim 1, wherein the processor is further configured to:

generate a digital vehicle occupant skeletal model based on the input; and estimate a second parameter based on the digital vehicle occupant skeletal model.

7. The vehicle of claim 1, wherein the detection of the first parameter was triggered by an action other than a contact of the steering wheel by a hand of the vehicle occupant is based on a correlation extent value between the first parameter and a second parameter is less than a threshold value.

8. The vehicle of claim 1, wherein the processor transmits the notification to a user device or a vehicle Human-Machine Interface.

9. A method to detect driver behavior in a vehicle, the method comprising:

obtaining, by a vehicle including a steering wheel, a first parameter from a first detection unit and an input from a second detection unit, wherein the first detection unit is configured to detect the first parameter associated with the steering wheel, wherein the first parameter is indicative of an interaction with the steering wheel, and wherein the second detection unit is configured to capture the input associated with a vehicle occupant;

estimating a first location of vehicle occupant hands in a vehicle interior portion at a first time based on the input;

estimating a probability of vehicle occupant hands touching the steering wheel based on the first location of vehicle occupant hands in the vehicle interior portion at the first time;

estimating a second location of vehicle occupant hands in the vehicle interior portion at a second time; and estimating a steering wheel torque based on the first time, the second time, the first location of the vehicle occupant hands at the first time, and the second location of the vehicle occupant hands at the second time;

comparing the steering wheel torque estimated based on the first time, the second time, the first location of the vehicle occupants hands at the first time, and the second location of the vehicle occupant hands at the second time with the first parameter;

determining, by the vehicle, that detection of the first parameter was triggered by an action other than a contact of the steering wheel by a hand of the vehicle occupant based on the comparison; and transmitting, by the vehicle, a notification responsive to a determination that detection of the first parameter was triggered by an action other than a contact of the steering wheel by a hand of the vehicle occupant.

10. The method of claim 9, wherein the first detection unit is a steering wheel touch sensor, and wherein the first parameter is associated with capacitive sensing of the steering wheel touch sensor.

11. The method of claim 9, wherein the first detection unit is a steering wheel torque sensor, and wherein the first parameter is associated with a steering wheel torque or steering wheel rotation angle.

12. The method of claim 9, wherein the second detection unit is at least one of a depth-sensing sensor, a Radio Detection And Ranging (radar) sensor, a time-of-flight (TOF) camera, and a Light Detection and Ranging (lidar) sensor.

13. The method of claim 9, wherein the input comprising at least one of a depth image, a plurality of voxels, and a point cloud.

14. A non-transitory computer-readable storage medium having instructions stored thereupon which, when executed by a processor, cause the processor to:

obtain a first parameter from a first detection unit and an input from a second detection unit, wherein the first detection unit is configured to detect the first parameter associated with a steering wheel, wherein the first parameter is indicative of an interaction with the steering wheel, and wherein the second detection unit is configured to capture the input associated with a vehicle occupant;

estimate a first location of vehicle occupant hands in a vehicle interior portion at a first time based on the input;

estimate a probability of vehicle occupant hands touching the steering wheel based on the first location of vehicle occupant hands in the vehicle interior portion at the first time;

estimate a second location of vehicle occupant hands in the vehicle interior portion at a second time; and estimate a steering wheel torque based on the first time, the second time, the first location of the vehicle occupant hands at the first time, and the second location of the vehicle occupant hands at the second time;

compare the steering wheel torque estimated based on the first time, the second time, the first location of the vehicle occupants hands at the first time, and the second location of the vehicle occupant hands at the second time with the first parameter;

determine that detection of the first parameter was triggered by an action other than a contact of the steering wheel by a hand of the vehicle occupant based on the comparison; and transmit a notification responsive to a determination that detection of the first parameter was triggered by an action other than a contact of the steering wheel by a hand of the vehicle occupant.

* * * * *